2,865,929
THENYL UREAS

David J. Beaver, Richmond Heights, and Paul J. Stoffel, St. Louis, Mo., assignors to Monsanto Chemical Company, St. Louis, Mo., a corporation of Delaware No Drawing. Application July 23, 1956
Serial No. 599,335

5 Claims. (Cl. 260—332.2)

This invention relates to new and useful thenyl ureas and to processes for making same.

In accordance with this invention it has been found that thenyl ureas of the structure

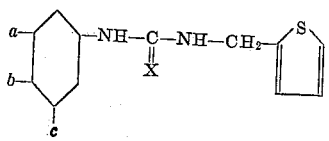

wherein a, b, and c are halogen or hydrogen, wherein X is sulfur or oxygen, and wherein at least two of said a, b and c substituents are halogen, are highly useful bacteriostats and are particularly useful in the control of *Micrococcus pyogenes* var. *aureus*. By "halogen" is meant bromine and chlorine, but preferably chlorine. These thenyl ureas are prepared by reacting α-thenyl amine with a compound of the structure

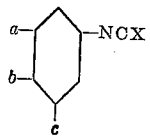

wherein a, b, c and X have the aforedescribed significance in the presence of an inert organic solvent at a temperature in the range of room temperature to the reflux temperature of the system.

As illustrative of the new compounds and the preparation thereof is the following:

Example I

To a suitable reaction vessel is added and mixed 18.8 parts by weight of 3,4-dichlorophenylisocyanate, 11.3 parts by weight of α-thenyl amine, and 86 parts by weight of diethyl ether. The reaction is very vigorous and permitted to seek its own temperature level. Upon cooling the mass the precipitate is filtered off and washed with two 15 parts by weight portions of diethyl ether. The product on drying is N-(3,4-dichlorophenyl) N'-(α-thenyl) urea (white granules, M. P. 169.8–170.5° C., yield=99%).

Example II

Employing the procedure of Example I but replacing 3,4-dichlorophenylisocyanate with a chemically equivalent amount of 3,4-dichlorophenylisothiocyanate, there is obtained N-(3,4-dichlorophenyl) N'-(α-thenyl) thiourea.

Example III

Employing the procedure of Example I but replacing 3,4-dichlorophenylisocyanate with a chemically equivalent amount of 3,4-dibromophenylisocyanate, there is obtained N-(3,4-dibromophenyl) N'-(α-thenyl) urea.

Example IV

Employing the procedure of Example I but replacing 3,4-dichlorophenylisocyanate with a chemically equivalent amount of 3,5-dichlorophenylisocyanate, there is obtained N-(3,5-dichlorophenyl) N'-(α-thenyl) urea.

Example V

Employing the procedure of Example I but replacing 3,4-dichlorophenylisocyanate with a chemically equivalent amount of 3,4,5-trichlorophenylisocyanate, there is obtained N-(3,4,5-trichlorophenyl) N'-(α-thenyl) urea.

The new thenyl ureas are particularly useful in controlling the bacteria *Micrococcus pyogenes* var. *aureus*. In this regard N-(3,4-dichlorophenyl) N'-(α-thenyl) urea was incorporated in an alkali metal fatty acid soap, specifically an "Ivory" brand neutral high grade white toilet soap [a mixture of alkali metal salts of fatty acids whose fatty acid content analyzes Oleic and linoleic acid_____ about 46%
Stearic acid_____ about 14%
Palmitic acid_____ about 30%
Lower fatty acids (myristic, lauric, etc.)___ about 10%]

in a weight ratio of one part to 50 parts soap. Aliquots were added to a Sabourard's dextrose agar medium so as to give concentrations as set forth below. The agar in each case was then poured into a Petri dish, allowed to harden and then inoculated with a standard culture of *Micrococcus pyogenes* var. *aureus* of standard resistance. The incubation in each instance was made at 37° C. for 48 hours. The extent of growth is noted below:

| Compound/Concentration, p. p. m. | 10 | 1 |
|---|---|---|
| N-(3,4-dichlorophenyl) N'-(α-thenyl) urea | none | none |

The same control of *Micrococcus pyogenes* var. *aureus* is obtained by replacing N-(3,4-dichlorophenyl) N'-(α-thenyl) urea with an equal weight of N-(3,5-dichlorophenyl) N'-(α-thenyl) urea and N-(3,4,5-trichlorophenyl) N'-(α-thenyl) urea. Good control of *Micrococcus pyogenes* var. *aureus* is obtained by replacing N-(3,4-dichlorophenyl) N'-(α-thenyl) urea with an equal weight of N-(3,4-dibromophenyl) N'-(α-thenyl) urea and N-(3,4-dichlorophenyl) N'-(α-thenyl) thiourea.

Replacing the foregoing "Ivory" brand soap with an equal weight of a "Lux" brand solid neutral white toilet soap (a mixture of alkali metal salts of fatty acids whose fatty acid content analyzes about 45% oleic and linoleic acid, about 30% palmitic acid, about 10% stearic acid, and about 15% lower fatty acids), the same results are obtained. The same results are also obtained using instead of a solid soap a liquid soap, such as that having a 40% alkali metal fatty acid soap content prepared from an alkali metal compound and a mixture of fatty acids obtained from a mixture of 75% cocoanut oil and 25% olive oil. Other alkali metal fatty acid soaps may also be used, e. g. the usual alkali metal (sodium and/or potassium) soaps of higher fatty acids of vegetable or animal origin, such as stearic, lauric, palmitic, oleic, linoleic, ricinoleic, and the like, or mixtures thereof obtained from tallow, lard, cocoanut oil, palm oil, castor oil, olive oil, hydrogenated cottonseed oil, and the like.

Relatively small amounts of these urea derivatives in a detergent soap composition have been found to yield effective antiseptic detergent soap compositions. Amounts as low as 0.5 to 1% by weight based on the weight of the detergent soap have proved satisfactory. However, it is preferred to employ these urea derivatives in amounts in the order of 1 to 5% by weight based on the detergent soap. While larger amounts, as for example up to 10% by weight, may be employed the upper limit will be determined by practical considerations. Various colors, antioxidants, perfumes, water softeners, emollients, and the like, may be included where desirable in detergent compositions containing these new ureas. The term "soap" or "detergent soap" as used herein is employed in its popular or ordinary meaning, i. e., those cleansing compositions prepared from an alkali metal compound such as potassium or sodium hydroxide and a fat or fatty acid, both saturated and unsaturated.

While this invention has been described with respect to certain embodiments, it is not so limited and it is to be understood that variations and modifications thereof obvious to those skilled in the art may be made without departing from the spirit or scope of this invention.

What is claimed is:
1. Thenyl ureas of the structure

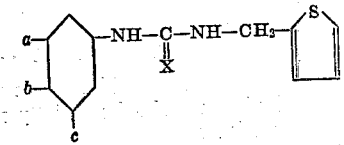

wherein X is selected from the group consisting of sulfur and oxygen, wherein $a$, $b$ and $c$, respectively, are selected from the group consisting of hydrogen and halogen, and wherein the substituents $a$, $b$ and $c$ total at least two halogen atoms, the said halogen atom being selected from the group consisting of chlorine and bromine.

2. N-(3,4-dichlorophenyl) N'-(α-thenyl) urea.
3. N-(3,4-dichlorophenyl) N'-(α-thenyl) thiourea.
4. N-(3,4,5-trichlorophenyl) N'-(α-thenyl) urea.

5. The process of making the compound of claim 1, which comprises reacting α-thenyl amine with a compound of the structure

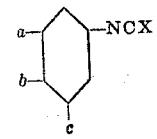

wherein X is selected from the group consisting of oxygen and sulfur, wherein $a$, $b$ and $c$ are selected from the group consisting of hydrogen and halogen, and wherein the substituents $a$, $b$ and $c$ total at least two halogen atoms, in the presence of an inert organic solvent at a temperature in the range of room temperature to the refluxing temperature of the system, the said halogen atom being selected from the group consisting of chlorine and bromine.

References Cited in the file of this patent
UNITED STATES PATENTS

| | | |
|---|---|---|
| 2,533,798 | Hartough | Dec. 12, 1950 |
| 2,704,245 | Searle | Mar. 15, 1955 |
| 2,710,839 | Swakon | June 14, 1955 |

OTHER REFERENCES

McKay: Can. J. Chem., 30:227 (1952).